April 26, 1966  J. P. KEMMER ETAL  3,247,717
AIR DATA PRESSURE TRANSDUCER APPARATUS
Filed April 5, 1962  4 Sheets-Sheet 1
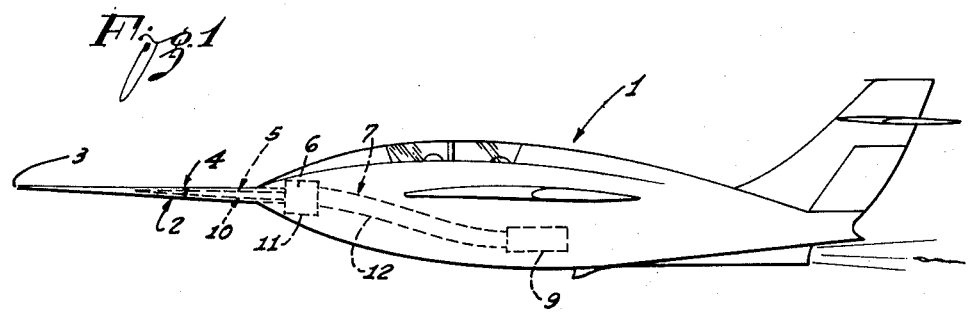
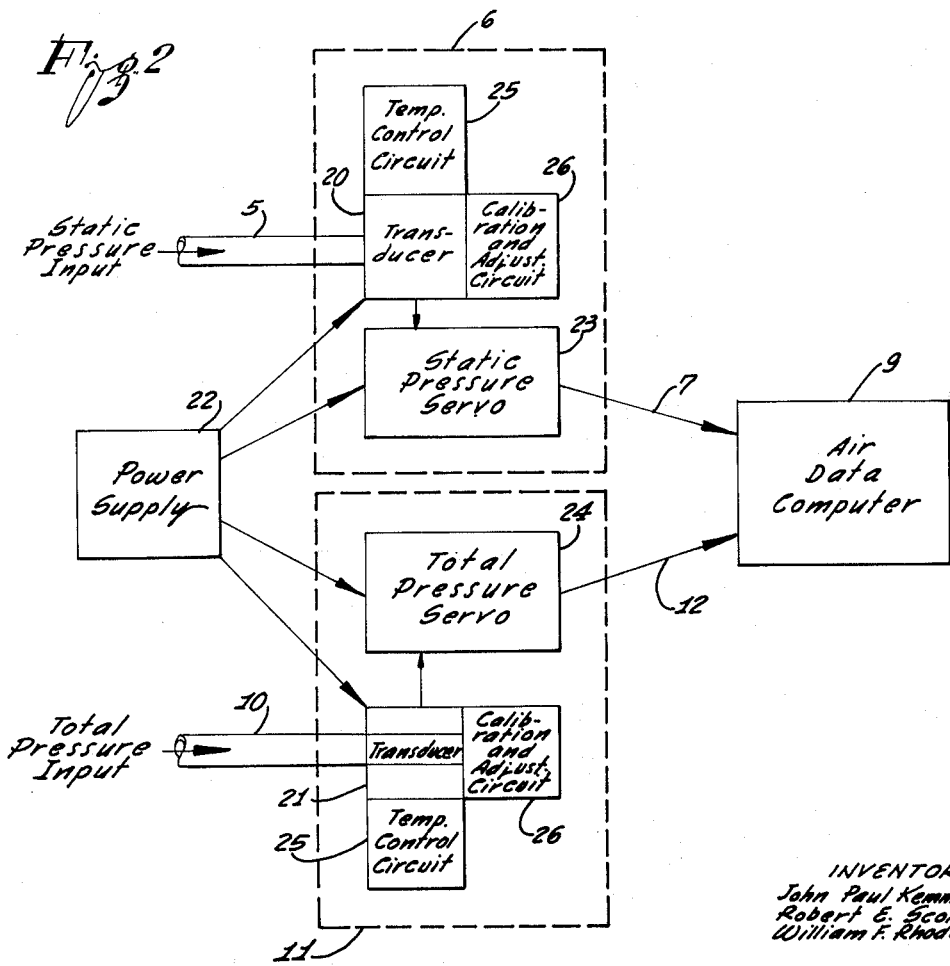
INVENTORS:
John Paul Kemmer
Robert E. Scott
William F. Rhodes
By Alan C. Rose
Attorney April 26, 1966  J. P. KEMMER ETAL  3,247,717
AIR DATA PRESSURE TRANSDUCER APPARATUS
Filed April 5, 1962  4 Sheets-Sheet 2

INVENTORS:
John Paul Kemmer
Robert E. Scott
William F. Rhodes

By Alan C. Rose
Attorney

April 26, 1966  J. P. KEMMER ETAL  3,247,717
AIR DATA PRESSURE TRANSDUCER APPARATUS
Filed April 5, 1962  4 Sheets-Sheet 4
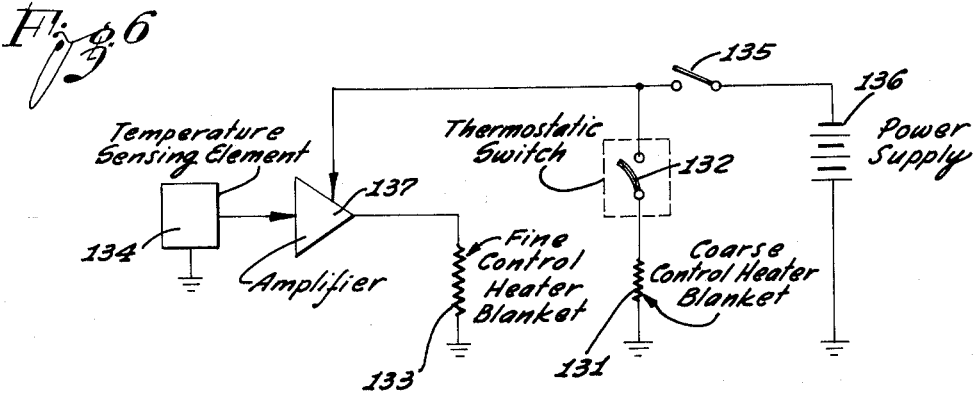
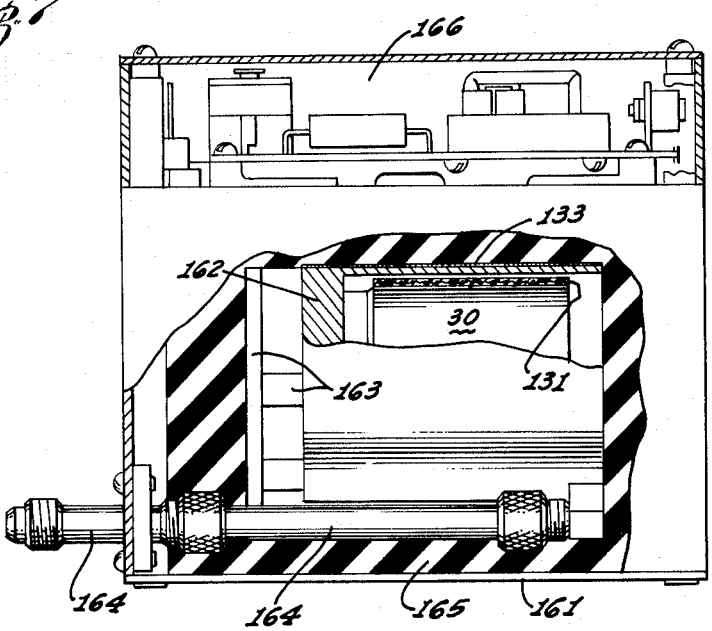
INVENTORS:
John Paul Kemmer
Robert E. Scott
William F. Rhodes
By Alan C. Rose
Attorney

United States Patent Office 3,247,717
Patented Apr. 26, 1966

3,247,717
AIR DATA PRESSURE TRANSDUCER
APPARATUS
John Paul Kemmer, Woodland Hills, Robert E. Scott,
Los Angeles, and William F. Rhodes, Canoga Park,
Calif., assignors to Litton Systems, Inc., Beverly Hills,
Calif.
Filed Apr. 5, 1962, Ser. No. 185,382
3 Claims. (Cl. 73—398)

This invention relates to air data computers and more particularly to the conversion of air pressures to electrical signals for use in such computers.

In the field of air data computers, it is necessary to obtain a voltage signal which represents the pressure outside the aircraft. Both static pressure indications and total pressure indications are converted into voltages, and these signals are operated upon in known manners to provide many of the signals used in conventional air data computers. A critical element in these systems is the transducer which is employed to convert pressure to electrical signals. Many of the systems which have been proposed up to the present time have involved mechanical arrangements in which gears are turned and mechanical linkages are moved back and forth in a servo system which compensates for the applied pressure. These systems are characteristically slow in response time and are subject to severe errors as a result of the ambient temperatures which must be accommodated in airplanes.

Furthermore, when an air data system of the prior art type is first put into operation after a plane has been standing out all night in the cold, for specific example, it has often taken 30 minutes to an hour before stabilized and accurate operating conditions are achieved.

Accordingly, an important object of the present invention is to reduce the warm-up time for pressure transducers used in air data computers.

A general object of the present invention is the simplification and improvement in reliability of air data systems.

Another object of the present invention is the precise stabilization of the temperature of transducers, and other precision instruments subjected to severe fluctuations in environmental temperature.

A further object of the present invention is to provide circuits that permit manual correction of nonlinearity and other errors in calibration built into electrical pressure transducers, and to allow periodic manual adjustment to be made for variations of surface barometric pressure conditions.

In accordance with one aspect of the invention, resistance-type strain gauges are employed in an air data computer as transducers to transform incoming total and static pressure into electrical signals. Furthermore, these pressure transducers are of low thermal mass and are provided with both coarse and fine heating controls to maintain them at a constant temperature.

In one illustrative embodiment of the invention, the pressure transducer may include a flexible diaphragm-type pressure responsive plate. The plate is mounted to bow or flex with changes of applied pressure. A series of rods are mounted near the edges of the plate to extend in both directions from it. Resilient resistance wires are secured to ends of the rods so that some of them increase in length and resistance when the plate flexes while others are reduced in length and resistance. Sets of the wires are arranged in a Wheatstone bridge which becomes unbalanced as the pressure changes. The mounting arrangements for the plate may also form the pressure chamber, and this assembly is of thin-walled material of low thermal mass. Diffuse heating arrangements are located in intimate extended contact with the mounting arrangements so as to readily transfer heat to the unit. In one preferred arrangement, a heating blanket of resistance wires imbedded in insulating material encloses the mounting arrangements and is energized to raise the pressure transducer to an elevated temperature. A thermally-conductive casing fits loosely around the heating blanket and is provided with a supplemental diffuse heating element on its outer surface. Sensitive control circuits are provided to raise the temperature of the transducer rapidly and to maintain it accurately at the desired elevated temperature.

The stabilized resistance wire form of pressure transducer may be provided with several adjustments, in accordance with the present invention. These adjustments include a nulling circuit to compensate for any imbalance of the resistance wires, a barometric pressure adjustment for periodic correction of the pressure transducer, and additional circuitry for standardizing the slope and form of the pressure transducer output characteristic.

In accordance with an important feature of the invention, an electrical pressure transducer is made of thin-walled material of low thermal mass and is provided with two heating blankets for coarse and fine heating stabilization.

In accordance with further features of the invention, the transducer apparatus may be provided with balance correction, zero correction, and correction both for the slope and the shape of its output signal.

The resulting apparatus is heated to stabilized operating conditions within a very few minutes, even under conditions of extreme cold. Furthermore, the various compensation circuits cooperate with the stabilized transducer to provide a pressure transducer package with precision sufficient to give altitude information for the air data computer which is accurate within a few feet at sea level.

The novel features which are believed to be characteristic of the invention, both as to its organization and method of construction and operation, together with further objects, features and advantages thereof, will be better understood from the following description considered in connection with the accompanying drawing in which illustrative embodiments of the invention are disclosed, by way of example. It is to be expressly understood, however, that the drawing is for the purpose of illustration and description only and does not constitute a limitation of the invention.

In the drawing:

FIG. 1 represents an aircraft carrying air pressure transducers and other air data computing apparatus, in accordance with one aspect of the present invention;

FIG. 2 is a block diagram showing the relationship of the air pressure transducers with the other components of the air data system, utilizing the principles of the present invention;

FIG. 6 is a circuit diagram of the heater control system of the present invention; and FIG. 7 represents the physical arrangement of a system for the conversion of pressure data in accordance with the present invention.

Figure 3:
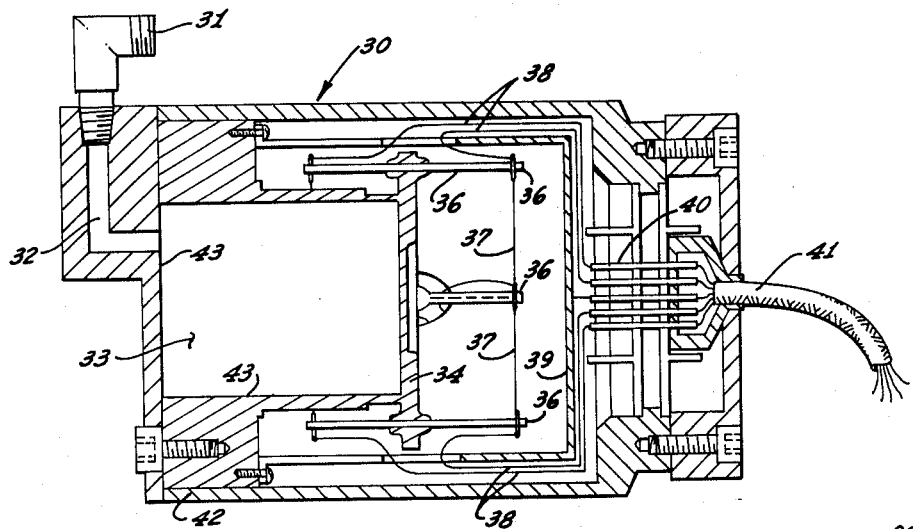
FIG. 3 represents a transducer in accordance with the principles of the present invention.

With reference to the drawings, FIG. 1 shows an airplane 1 having a boom 2 protruding from its nose. A port 3 is located at the front end of the boom 2 to provide an indication of total pressure. The boom also has a number of small ports 4 opening laterally from its outer surface. The ports 4 are connected to a manifold (not shown) and this manifold is connected to a static pressure measurement tube 5. The tube 5 passes through the boom 2, into airplane 1, to the static pressure data conversion apparatus 6. The static pressure is converted into an electrical signal by the apparatus 6. The signal is transmitted by cable to the air data computer 9 which is normally located in the electrical compartment of the airplane. The port 3 is, in a similar manner, connected to a total pressure tube 10 which passes through the boom 2, into the airplane 1, to the total pressure data conversion apparatus 11. The total pressure reading delivered to the apparatus 11, by the tube 10, is converted to an electrical signal by the apparatus 11. The signal is transmitted by cable 12 to the air data computer 9.

FIG. 2 is a block diagram showing the relationship of the system employed in the conversion and transmission of air pressure information to the air data computer. In FIG. 2, the static pressure input is delivered by the tube 5 to the transducer 20 of the static pressure data conversion apparatus 6. The total pressure data is delivered by tube 10 to the transducer 21 of the total pressure data conversion apparatus 11. The resistances of the transducers 20 and 21 are functions of the respective input air pressures delivered by tubes 5 and 10. The power supply 22 provides suitable voltages to the transducers 20 and 21. As the input pressures change, the resistances of the transducers 20 and 21 change, varying the output voltages of the transducers 20 and 21. The output voltage of the static pressure transducer 20 is delivered to a static pressure servo 23, the output electrical signal of the latter being applied by cable 7 to the air data computer 9. Similarly, the output voltage of the total pressure transducer 21 is delivered to a total pressure servo 24, and the output electrical signal of the servo 24 is connected by cable 12 to the air data computer.

Separate temperature control circuits 25 are mechanically attached to each of the transducers 20 and 21, for the purpose of stabilizing their operating temperatures. Each of the transducers 20 and 21 is also electrically associated with a calibration and adjusting circuit 26.

FIG. 3 represents an unbonded electrical resistance strain wire gauge, commonly termed a transducer. In FIG. 3, air pressure is admitted to the transducer 30 through the pneumatic fitting 31, and thence through a passage 32, into an airtight chamber 33. The forward walls of the chamber 33 comprise a flexible diaphragm-like structure 34. Variations in air pressure within the chamber 33 produce a flexure of the structure 34. As the structure flexes, the ends of the pins 36, which are secured to the structure 34, are pivoted toward or away from each other. Resilient strain wires 37 of resistive material are stretched between the pins 36. As the distance between the pins 36 changes, the length of the strain wires 37 changes. As the length of the strain wires 37 increases, their electrical resistance increases, and conversely, as their tension and length decrease, the electrical resistance of the strain wires 37 decreases.

Electrical conductors 38 are connected to the ends of the strain wires 37. The wires pass through a shield 39 to a plug 40, which is employed to connect the strain wires 37 electrically with a circuit external to the transducer, by means of a cable 41.

Transducers found in the prior art have substantial and relatively massive walls particularly near the base 43 of the structure. In accordance with the present invention, the mass and thermal inertia of the transducer 30 is greatly reduced. Specifically, the mass of the base 43 of the structure 34, the walls 42, and other components are minimized. Heat is applied to the walls 42, by diffuse heating blankets energized by a temperature control system, as disclosed below, to maintain the transducer at a constant temperature, despite fluctuations of the environmental temperature. Reduction of the mass of the structure and other component parts of the transducer results in increased speed of heat conduction and greatly reduced warm-up time. The transducer is encased in insulating material so that heat conduction due to environmental temperature changes is minimized.

Figure 4:
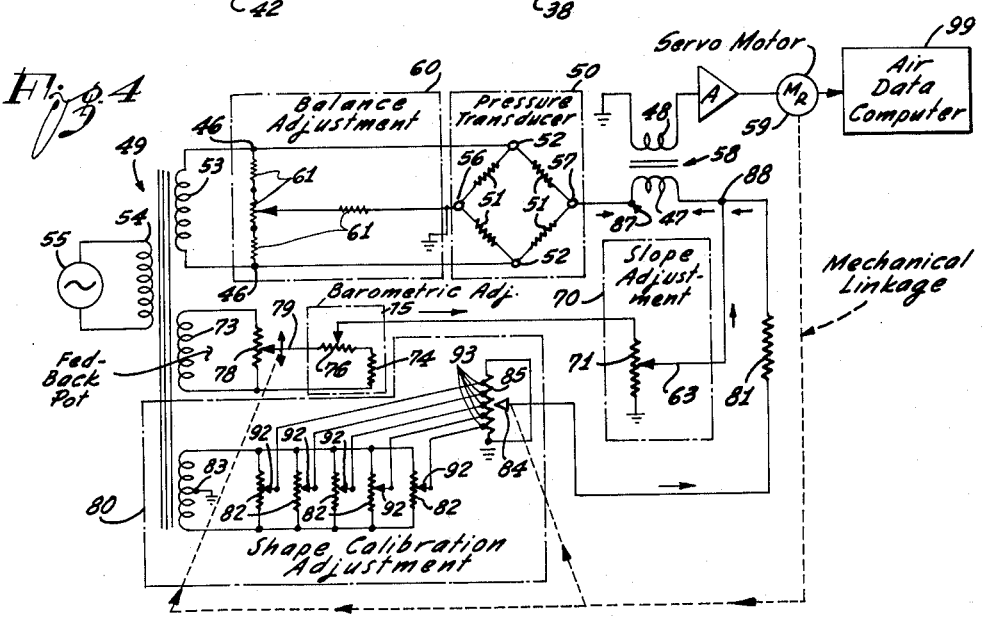
FIG. 4 is a circuit diagram of a portion of a system for the conversion of pressure data, in accordance with the principles of the present invention.

FIG. 4 is a circuit diagram of a system using the transducer of FIG. 3 wherein an electrical signal, which is a function of the air pressure input to a transducer, is transmitted to an air data computer. Referring to FIG. 4, the transducer 50 (corresponding to the unit of FIG. 3) is electrically comprised of four resistance components which are the strain wires 51 and the leads 52, 56 and 57 thereto. The strain wires 51 are connected in the form of the well-known Wheatstone bridge circuit. Both of the resistance wires in one of the opposed pairs of wires 51 are mechanically connected to outer ends of the rods 36 of FIG. 3, while the other two resistance wires of the bridge are connected to the inner ends of the rods 36. Voltage is applied to the strain wires 51 at the leads 52 from the secondary winding 53 of a transformer 49, the primary winding 54 of the transformer 49 being connected to a source 55 of alternating current. A preferred source 55, which is commonly available in airborne systems is a 26 volt, 400 cycles per second sinusoidal or square wave, alternating current supply. The transformer 49 has three secondary windings 53, 73 and 83 which may provide a potential of 5 volts across each of windings 53 and 73, and 1 volt across winding 83. Winding 83 is grounded at its mid-point. The air data computer 99 is commonly supplied from the same source 55 for the purpose of minimizing the effects of any variations in the source.

A change in the air pressure input to the transducer 50 produces a corresponding change in the electrical resistance of the strain wires 51, as has been discussed in the paragraphs above. Specifically, as noted above, opposed pairs of the wires 51 of FIG. 4 are connected to outer and inner points, respectively, on the posts 36 of FIG. 3, for extension and shortening, respectively, with changes in pressure. Changes in the resistance of the strain wires 51 unbalances the Wheatstone bridge and produces a corresponding change in the voltage output of the transducer 50, at the leads 56 and 57. The lead 56 is grounded to provide a fixed reference point for the transducer 50 and the balance adjustment circuit 60.

The output signal of the transducer 50 is applied to a servo motor 59 through a transformer 58 and an amplifier. One terminal 87 of the primary winding 47 of the transformer 58 is connected to the lead 57, and one terminal of the secondary winding 48 of the transformer 58 is connected to the servo amplifier and the servo motor 59. The other terminal of the secondary winding 48 is grounded. The terminal 88 of the primary winding 47 is connected to both the principal circuit branch including the slope adjustment circuit 70, the barometric pressure adjustment circuit 75 and the feedback potentiometer 78, and, through a fixed resistor 81, to subsidiary slope calibration circuit 80.

The barometric pressure adjustment circuit 75 is comprised of a potentiometer 76, with a fixed resistor 74 connected in series between one terminal of potentiometer 76 and the junction of feedback potentiometer 78 and one end of the secondary winding 73. The other terminal of the potentiometer 76 is connected to the adjustable contact 79 of the feedback potentiometer 78. The adjustable contact 79 is mechanically driven by the servo 59 as indicated by the dashed line. The feedback potentiometer 78 is connected across the secondary winding 73 of transformer 49.

The slope adjustment circuit 70 includes a variable resistance element 71. The manually adjustable contact 63 of the slope adjustment circuit 70 is connected to the terminal 88 of the primary winding 47. One terminal of the slope adjustment potentiometer 71 is connected to the barometric adjustment circuit 75, and the other terminal is grounded.

The zero adjustment circuit 60 includes a variable and several fixed resistance elements 61. The circuit 60 permits varying amounts of resistance to be connected at terminals 46 in parallel with the strain wires 51 and the secondary winding 53.

The calibration adjustment circuit 80 is comprised of the calibration poteniometer 85, and a group of potentiometers 82. The adjustable contact 84 of the calibration potentiometer 85 is mechanically driven by the servo motor 59, as indicated by the dashed line representing a mechanical linkage. The adjustable contact 84 is connected to terminal 88 of the primary winding 47 through a resistor 81. The potentiometers 82 are connected in parallel across the terminals of secondary windings 83 of the transformer 49. The manually adjustable contacts 92 of one or more of the potentiometers 82 may be connected to one or more terminals 93. The terminals 93 are connected to the resistance element of the calibration potentiometer 85, at intermediate points along the length of that resistance element.

To describe the fundamental operation of the system shown in FIG. 4, an initial condition of the system will be assumed, and the function of the adjustment circuits 60, 70, 75 and 80 will be disregarded. Initially, an electrical potential of 5 volts is supplied to each of the secondary windings 53 and 73. The voltage applied from winding 53 to terminal 87 of transformer 58 is equal to the voltage applied from winding 73 to terminal 88. Thus, no signal is transmitted from the transformer 58 to the servo amplifier and servo motor 59, and the output signal to the computer 99, representing the position of servo motor 59, is constant.

A change in the air pressure input to the transducer 50 produces a change in the electrical resistance of the strain wires 51, and shifts the balance of the Wheatstone bridge, as discussed above. The change in resistance of the strain wires 51 produces a change in the voltage at terminal 87. The voltages at terminals 87 and 88 are no longer equal, and the differential voltage produces a signal which is amplified and transmitted to the servo motor 59, through the transformer 58.

The signal energizes the servo motor 59. The motor 59 mechanically drives the adjustable contact 79 of the feedback potentiometer 78. The potentiometer 78 changes the voltage at terminal 88, so that the resulting voltage at terminal 88 equals the voltage at terminal 87. Following this balancing action, a signal is no longer transmitted to the servo 59 by the transformer 58.

The servo motor 59 is then at rest, and its position is a function of the applied pressure. The computer 99 now has available to it a signal representing the new air pressure input to the transducer 50. This input to the computer 99 may be in the form of a mechanical movement from a cam, or the electrical signal from a potentiometer or synchro, for specific examples.

Figure 5:
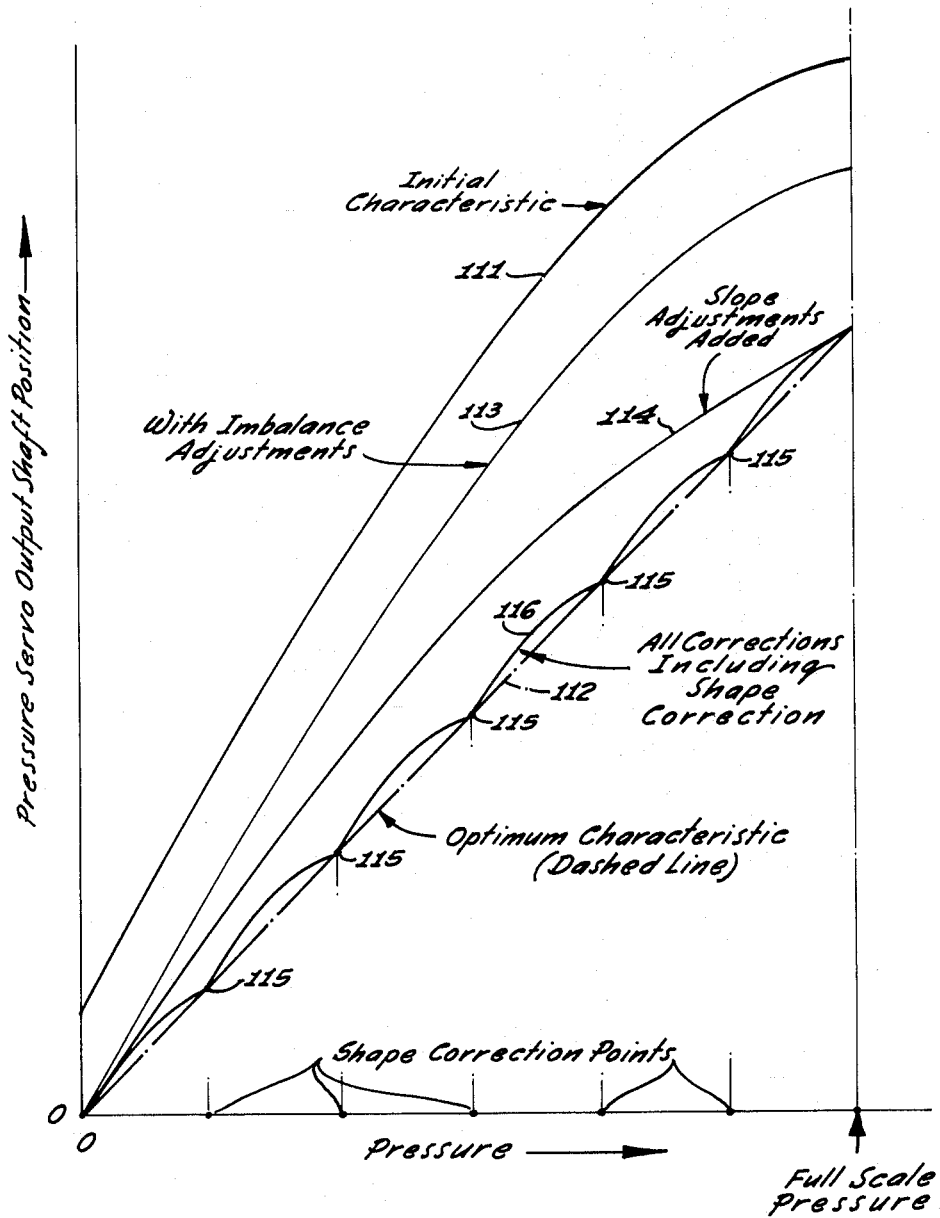
FIG. 5 is a graph showing the transducer circuit output ploted against the transducer input air pressure, illustrating the effect of various calibration and adjustment circuits.

The operation of the adjustment circuits 60, 70, 75 and 80 will now be considered in connection with the characteristic curves shown in FIG. 5. The nature of each of the four adjustment circuits has been discussed generally above. With reference to FIG. 5, the characteristic 111 represents the initial electrical output versus pressure signal from the pressure servo, before any corrections have been made. In contrast to this curved and displaced characteristic, the optimum characteristic desired from the system is indicated by the dashed line 112 extending from the point of zero pressure and the zero of the servo motor position in an exact straight line to the full-scale pressure range indicated by the right-hand line of FIG. 5.

It is evident that the curve 111 does not pass through the origin of the coordinates of the plot of FIG. 5. Through the adjustments indicated at 61 in circuit 60, any errors or imbalance in the Wheatstone bridge 51 can be adjusted so that the pressure transducer is precisely balanced when the pressures on each side of the diaphragm-type plate 34 of FIG. 3 are the same. In one embodiment, the space to the right of the plate 34 of FIG. 3, is evacuated and sealed. Accordingly, when no gas pressure is applied to the other side of the plate 34, the transducer should be exactly in balance. However, as shown in FIG. 5, the transducers are often naturally unbalanced, as they are manufactured, and must be electrically corrected by the adjustment circuitry 60 to make them present an electrically balanced output. The curve 113 of FIG. 5 shows the shift in the characteristic which may be produced by the adjustment circuit 60.

As contrasted with the plot 113, the characteristic 114 indicates the change which may be made by the slope adjustment potentiometer circuit 70. This variable resistance circuit essentially limits the current from the feedback potentiometer 78, thus reducing the maximum output from the circuit. Following careful adjustment of the slope circuit 70, the right-hand end of the characteristic 114 precisely coincides with the optimum standardized characteristic 112 noted above.

The barometric pressure adjustment circuit 75 includes the relatively large resistor 74 and a precision potentiometer 76 relatively small resistance. This circuit 75 is employed to compensate for the irregular daily variations in atmospheric pressure. Thus, for example, considering static pressure measurements, assume that the full-scale pressure at the right-hand edge of FIG. 5 produced an output altitude reading equal to sea level. Now let us suppose that the atmospheric pressure as read on a barometer has dropped significantly while the aircraft on which the unit is mounted stands idle for a day or two. If no readjustment were made, the indicated altitude would be several hundred feet above sea level, corresponding to the reduced pressure sensed by the transducer. It is necessary, therefore, to adjust the resistance 76 in accordance with atmospheric conditions prior to setting the unit in operation. In this manner, accurate initial and subsequent readings are obtained. The effect of changing ambient atmospheric pressure conditions is essentially that of shifting the value of full-scale pressure at the right of FIG. 5, and compensation for this shift may be made by a slight change in the slope of the characteristic.

The final shape calibration adjustment is accomplished by circuit 80, and brings the characteristic 114 substantially into coincidence iwth the optimum characteristic 112. The taps 93 on the potentiometer 84 correspond to the points 115 along the length of the characteristic 112. The secondary winding 83 applies a voltage across the variable resistors 82 which is a fraction of that appearing cross the secondary windings 53 and 73. Through the use of the potentiometer 85, the characteristic 114 may be pulled into coincidence with characteristic 112 at each of the points 115. This is accomplished by applying a known pressure to the transducer and adjusting the voltage at the potentiometer 82 adjacent the tap 93 which corresponds to the proper position of the potentiometer contact on 84 in correction circuit 80. This procedure is repeated at each of the pressures corresponding to the points 115 and all of the resistors 82 are adjusted so that the output from the servo 59 accurately represents the known applied pressure. The final characteristic 116 is shown with its departures from the optimum characteristic 112 greatly exaggerated. Thus, the points 115 along the curve are exactly on the optimum characteristic 112. The curvature of the intermediate sections of characteristic 116 between the points 115 then correspond to the curvature of the corresponding section of the smooth curve 114. In view of the smoothness and uniformity of characteristic 114, the sections of the final characteristic 116 will be correspondingly smooth and will therefore depart only slightly from the optimum characteristic 112.

FIG. 6 shows the heater control circuit for operating the course and fine heating elements described above. The circuit includes the coarse heating element 131 and is actuated by a simple bimetallic thermostatic switch 132. The fine heating control resistance 133 is energized in accordance with the temperature sensed at the thermistor sensing element 134. From an overall standpoint, the pressure transducer is maintained at a temperature of approximately 160° F., but may be set at any value required for a particular application. The thermostatic switch 132 is designed to release at approximately 138° F. It has some "carryover" and assists in raising the temperature above 138° F. toward the 160° F. control temperature. The fine temperature control heating element 133, however, is adjustably heated to maintain the temperature of the entire unit precisely at the desired control temperature.

The circuit of FIG. 6 includes, in addition to the components noted above, a main control switch 135 for connecting the circuit to a source of power 136. In FIG. 6, the signals sensed by the thermistor 134 are applied to the amplifier 137 which in turn controls the application of current from the power supply 136 to the fine heater control element 133.

FIG. 7 is a view, partly in cross-section, of the transducer 30 of FIG. 3 enclosed in a housing 161 and equipped with the heater control apparatus mentioned above. Enclosing the pressure transducer 30 is the coarse heater blanket 131, the conductive supporting and shielding housing 162 and an outer resistive layer or blanket 133 which provides fine temperature control. The coarse heating control element 131 may be a resistive wire mesh imbedded in fiberglass. It preferably makes a loose fit between the casing 162 and the pressure transducer 30. The resultant air space prevents the occurrence of excessive thermal gradients from one end of the sensor to the other. The fine heating element 133 on the outer surface of the casing 162 may take the form of a resistive coating. One suitable coating of this type is disclosed in U.S. Patent No. 2,679,569, granted May 25, 1954, to R. D. Hall. The structural members 163 support the casing 162 rigidly in position and prevent displacement of the pressure transducer 30 under conditions of severe shock or vibration. Air from the total or the static pressure port is supplied to transduced 30 through the tube 164. The space between casing 162 and housing 161 is filled with heat insulating and shock absorbing material 165 such as sponge rubber, polyfoam, or a fiberglass blanket.

An upper electronic compartment 166 houses many of the components disclosed in the electronic circuits of FIGS. 4 and 6. The thermistor 134 and thermostatic switch 132, of course, are located within the housing 162 adjacent the pressure transducer 30.

In closing, it is considered useful to review some of the factors which led to the shift from clumsy, bulky and heavy mechanical units to the electrical transducers of the present invention. Prior to the present invention, it was uniformly considered by those working in the industry that the variations in characteristics of the electrical transducers from unit to unit were so great as to preclude their use. Accordingly, many manufacturers have continued to use their old-fashioned bellows-and-mechanical movement type of pressure transducer. However, we discovered that even the very high accuracy requirements of air data computers can be met with resistance-type strain gauges, in view of their high stability. Thus, while the characteristics of the transducers differ markedly from unit to unit, the characteristics of any one unit are exceedingly stable, consistent and reproducible. We have therefore found that, by the inclusion of proper correction circuitry of many types, as described above, electrical standardization of the transducers may be accomplished. As noted above, the resultant units are accurate in determining elevation to within a few feet, at sea level. The units are also exceedingly rugged and shock-resistant. Furthermore, faster response is achieved than with mechanical units, and temperature stabilization is much more rapid. Collateral advantages include reduction in bulk and weight of the transducer and associated circuitry.

It is to be understood that the above-described arrangements are illustrative of the application of the principles of the invention. Numerous other arrangements may be devised by those skilled in the art without departing from the spirit and scope of the invention. Thus, by way of example and not of limitation, the pressure transducer may be of the variable reluctance, semiconductive, or capacitive form in place of the resistance wire-type strain gauge described in the present invention as the preferred embodiment. Accordingly, from the foregoing remarks, it is to be understood that the present invention is limited only by the spirit and scope of the appended claims.

What is claimed is:

1. A fast-acting, thermally-stabilized pressure transducer apparatus for use in an air data computer system, comprising:
   a flexible pressure responsive plate;
   rods mounted transversely on the edges of said plate to extend in two directions from said plate;
   a first resistance wire secured to said rods on one side of said plate;
   a second resistance wire secured to said rods on the other side of said plate;
   thin-walled mechanical mounting means of low thermal mass for supporting said plate and providing a chamber opening on one side of said plate;
   means for applying pressure to one side of said plate for increasing the length of said first and decreasing the length of said second resistance wire to change their resistances in opposite directions;
   circuitry for connecting said first and second wires into a Wheatstone bridge for unbalance as pressure is applied to said plate;
   a coarse heating blanket in extended contact with the outer surface of said mounting means;
   a thin-walled supporting shell loosely enclosing said blanket and mounting means;
   additional fine control heating arrangements in extended contact with said supporting shell;
   temperature sensing means within said shell for applying current to said coarse heating blanket and fine heating arrangements to accurately control the temperature of said transducer;
   heat insulating means enclosing the supporting shell;
   circuit means for correcting for electrical imbalance in said Wheatstone bridge;
   servo means for developing an electrical signal to buck out the electrical signal developed across said Wheatstone bridge;
   adjustable circuitry connected with said servo means for compensating for barometric pressure changes;
   means for directing the bucking electrical signal through an adjustable resistance, for varying the slope of the output characteristic of the transducer; and
   circuit means for changing the shape of the transducer output characteristic.

2. A fast-acting, thermally-stabilized pressure detecting apparatus for use in an air data computer system, comprising:
   an electrical pressure transducer;
   mounting means of low thermal mass for supporting said transducer;
   means for applying pressure to said transducer to vary its electrical impedance;
   circuit means for producing an electrical transducer signal based on the impedance of said transducer;
   a coarse heating blanket in extended heat-transferring proximity with said mounting means;

additional fine control heating arrangements in heat-transferring proximity with said mounting means;
temperature sensing means near said transducer for applying current to said coarse heating blanket and fine heating arrangements to accurately control the temperature of said transducer;
heat insulating means enclosing the transducer and its mounting means;
servo means for developing an electrical signal to buck out said transducer signal;
adjustable circuitry connected with servo means for compensating for barometric pressure changes;
means for directing the bucking electrical signal through an adjustable resistance, for varying the slope of the output characteristic of the transducer; and
circuit means connected to said bucking electrical signal for changing the shape of the transducer output characteristic.

3. In combination:
an aircraft;
an air data computer in said aircraft;
ports on said aircraft for detecting static and total pressure, first and second stabilized pressure transducer apparatus coupled, respectively, to said static and total pressure ports;
each said pressure transducer apparatus including:
(a) an electrical pressure-responsive element;
(b) thin-walled mechanical mounting means of low thermal mass for supporting said element;
(c) means for applying pressure to said element to change its electrical impedance;
(d) electrical circuit means for connecting said element into a Wheatstone bridge circuit for unbalance as pressure is applied to said element;
(e) a coarse control heating blanket in extended heat transferring proximity with said mounting means;
(f) additional fine control heating arrangements in extended heat-transferring relationship with said mounting means;
(g) temperature sensing means near the element for applying current to said coarse heating blanket and said fine heating arrangements to accurately control the temperature of said element;
(h) heat insulating means enclosing said element and its mounting means;
(i) circuit means for correcting for electrical imbalance in said Wheatstone bridge;
(j) servo means for developing an electrical signal to buck out the electrical signal developed by said Wheatstone bridge;
(k) adjustable circuitry connected with said servo means for compensating for barometric pressure changes;
(l) means for directing the bucking electrical signal through an adjustable resistance, for varying the slope of the output characteristic of the transducer; and
(m) circuit means for changing the shape of the transducer output characteristic; and
means for coupling the output from the servo means to said air data computer.

References Cited by the Examiner
UNITED STATES PATENTS

| | | |
|---|---|---|
| 2,714,309 | 8/1955 | Redemske. |
| 2,807,167 | 9/1957 | Statham 73—398 |
| 2,958,056 | 10/1960 | Giovanni 73—398 X |
| 3,041,548 | 6/1962 | Keen et al. 219—210 X |
| 3,088,035 | 4/1963 | Neil 323—79 |
| 3,089,341 | 5/1963 | Gay 73—398 |
| 3,090,229 | 5/1963 | Howard 73—183 |

RICHARD C. QUEISSER, *Primary Examiner.*

J. J. SMITH, D. DEIOMA, *Assistant Examiners.*